United States Patent [19]

Le Breton et al.

[11] Patent Number: 4,765,759
[45] Date of Patent: Aug. 23, 1988

[54] JOURNAL BEARING SUPPORT AND ALIGNMENT DEVICE

[75] Inventors: Albert F. Le Breton, Longwood; William S. Beal, Winter Springs, both of Fla.

[73] Assignee: Westinghouse Electric Corp., Pittsburgh, Pa.

[21] Appl. No.: 61,764

[22] Filed: Jun. 15, 1987

[51] Int. Cl.$^4$ .............................................. F16C 23/02
[52] U.S. Cl. ..................................... 384/252; 384/434
[58] Field of Search ............... 384/252, 434, 256, 257, 384/438, 441, 428

[56] References Cited

U.S. PATENT DOCUMENTS

| | | | |
|---|---|---|---|
| 1,323,281 | 12/1919 | Holy | 384/438 |
| 3,478,450 | 11/1969 | Grange et al. | 384/434 |
| 4,251,121 | 2/1981 | Johne et al. | 384/428 |
| 4,560,290 | 12/1985 | Siebert | 384/434 |

Primary Examiner—Lenard A. Footland

[57] ABSTRACT

A method and apparatus for supporting a journal bearing includes a three-part support key. The top piece is a rectangular member having a male cylindrical surface formed to mate with a female cylindrical groove formed axially with respect to a rotor in the bearing shell, and a female cylindrical surface formed perpendicularly to the male cylindrical surface. A middle piece having a top surface adapted to conform with the female cylindrical surface of the top piece and a flat bottom surface which is mated with the top piece and inserted within a keyway formed in the bearing pedestal. Thereafter, a bottom piece in the form of a variable thickness shim is inserted between the flat bottom surface and the keyway to align the rotor.

14 Claims, 2 Drawing Sheets

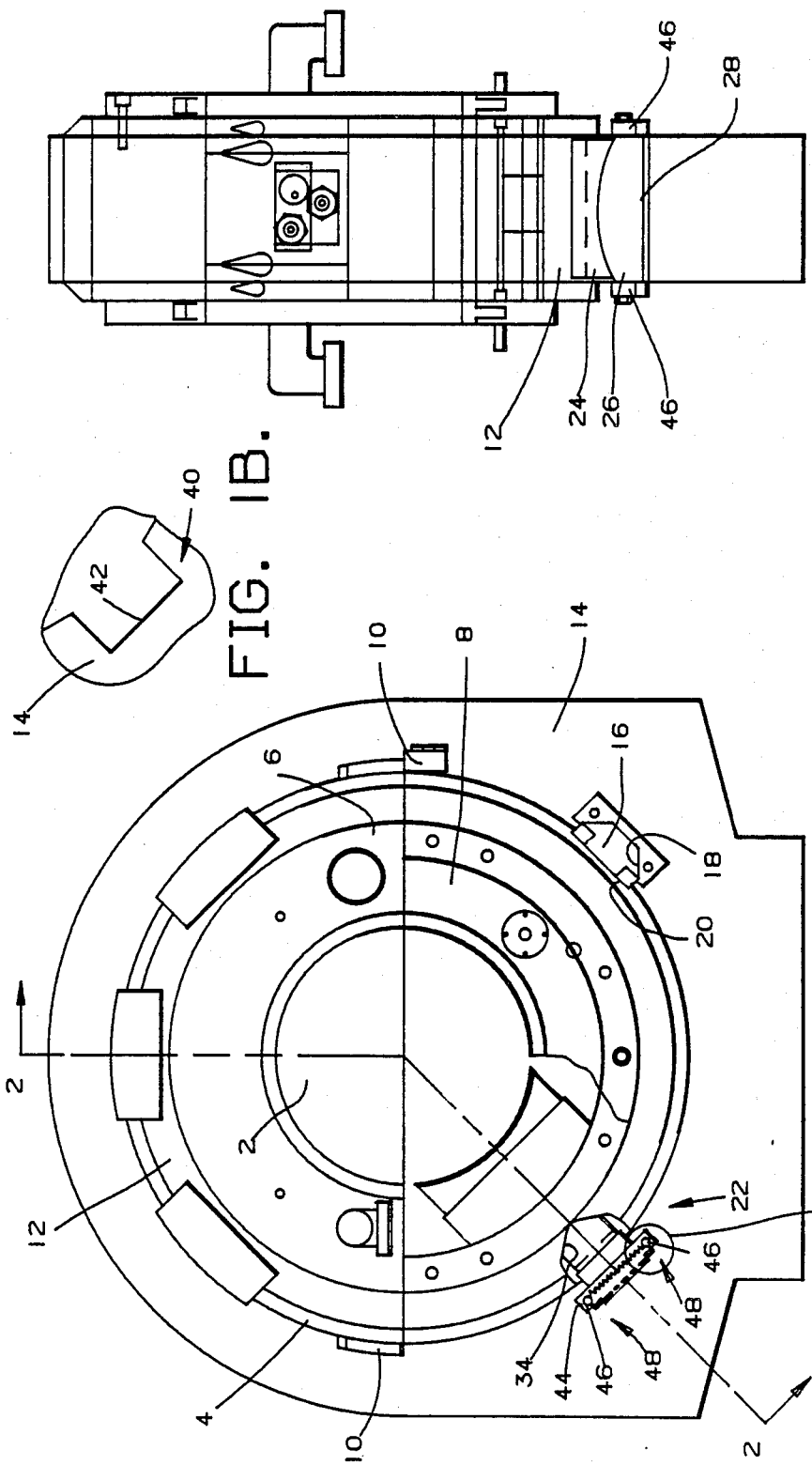

JOURNAL BEARING SUPPORT AND ALIGNMENT DEVICE

BACKGROUND OF THE INVENTION

This invention is related generally to steam turbines and generators, and more particularly to a method and apparatus for aligning the rotor of such steam turbines or generators, wherein the rotor is supported at its ends by a pair of journal bearings.

Journal bearings for steam turbine and generator rotors must be supported in their housings by an arrangement that is sufficiently stiff such that it does not influence the vibrational characteristics of the rotor train, and yet provides enough mobility to allow the bearing to be aligned to the proper horizontal and vertical location to support the rotor. If the bearing support arrangement is not stiff or has a variable stiffness dependent on the installation procedure, the rotor train vibrational characteristics could be affected undesirably resulting in lateral critical speeds becoming resonant with rotational speed. Because the rotor train must be accurately aligned to reduce misalignment bending shaft stresses and bearing pressures, the bearing support arrangement must also provide a means of vertical as well as horizontal motion capability to accomplish adequate alignment.

Large steam turbines, such as the BB73 model manufactured by Westinghouse Electrical Corporation, typically include a rotor and a pair of journal bearings supporting the rotor at its ends, each of the journal bearings having an upper half and a lower half adapted to be joined together forming a bearing shell which is mounted within a spherical bore of a bearing pedestal or support. Since the rotors of such turbines must of necessity operate in an aligned condition, various means have been provided in the past to support the journal bearings within their respective bearing supports. One prior art approach which provides such support is commonly referred to in the art as a three-key bearing support system.

In the widely-used three-key bearing support system, the upper half of each journal bearing includes a first keyway, formed longitudinally therein with respect to the rotor to contain a bearing support pad or key having an outer male spherical surface adapted to conform to the spherical bore in the bearing support. Second and third keyways are formed longitudinally in the lower half of the journal bearing to respectively contain second and third bearing support pads or keys. Such second and third keyways are often spaced radially 90° from one another substantially equidistant from a plane which bisects the lower half radially. Like the first bearing support pad or key, the second and third bearing support pads or keys include an outer male spherical surface which is adapted to substantially conform to the spherical bore in the bearing support.

Each of the three bearing support pads or keys, prior to assembly, have in the past been rigidly attached within their respective keyways. Typically, such rigid attachment is provided by threadedly coupling the bearing support pads or keys to their respective keyways. In order to align the rotor, however, alignment shims or liners are first inserted as necessary between the bearing support pad or key requiring adjustment in its keyway. Thereafter, the outer male spherical surfaces of each bearing support pad or key is handworked by filing or scraping the surface to provide a predetermined percentage of contact between the surface and the spherical bore of the bearing pedestal or support. Since the bearing support pad or key which is installed in the upper half of each journal bearing is substantially free of the weight of the rotor, the fit of the bearing support pad or key in the upper half of the journal bearing is not critical and, more often than not, a 10% contact between the bearing support pad or key installed in the upper half of the journal bearing and the spherical bore is suitable. On the other hand, at least 75% contact is often required for the bearing support pads or keys installed in the lower half of the journal bearing. It can be readily appreciated, therefore, that changes of alignment shims or liners will necessitate reworking of the outer male spherical surfaces of the bearing support pads or keys installed in the lower half of the journal bearings in order to maintain the at least 75% contact.

Such changes of alignment shims or liners may be required to align the rotor when changing conditions such as the settling of the turbine's or generator's foundation, whereon adjacent bearings, or distortion in the turbine or generator as a whole, cause the rotor to become misaligned. Alignment of the rotor must also be checked, with changes to alignment shims or liners made as necessary, when the rotor has been removed from the turbine or generator for maintenance. Because the bearing support pads or keys in prior art approaches have been rigidly attached to the journal bearing, changes increasing or decreasing the thickness of the alignment shims or liners create radii which are greater or less than the radii before the change. That is, the true radius from the center of a rotor to the outer male spherical surface of a bearing support pad or key is increased or decreased when alignment shims or liners are added or removed. These added or removed alignment shims or liners cause a change of position of the bearing support pad or key within its keyway such that changes in the percentage of contact between the outer male spherical surface of the bearing support pad or key and the spherical bore result. Therefore, changes of alignment shims or liners often require repeated handworking of the outer male spherical surfaces of the bearing support pads or keys, especially those installed in the lower half of the journal bearing to maintain at least 75% contact. Such repeated handworking in large steam turbines or generators may often consume hours or even days of effort.

In the recent past, a newer method and apparatus for supporting tilt pad journal bearings have been devised. This approach replaces the spherical pads and mating circumferential groove (i.e., the spherical bore) with a pair of triangular keys and mating V-grooves. The rationale behind this concept was that once the triangular keys were fitted into their grooves, no future refitting of contact surfaces would be necessary for alignment or realignment. Any alignment move would be made with rectangular shims having complex tapers. Nevertheless, during installation and alignment of the triangular keys, considerable difficulty was experienced in the past in obtaining proper contact between the triangular key and its mating V-groove due to the difficulty of field machining the V-grooves into the bearing support with true perpendicular flat surfaces, considerable time was spent in hand-scraping the fitted surfaces to achieve proper contact. Furthermore, during subsequent alignment moves, the triangular key shifted in its groove because of the use of improperly tapered shims, resulting in unacceptable contact gaps between the triangular keys and V-grooves. More often than not, the rotor had to be removed, the bearing lifted, and the keys refit into the bearing support. An excessive amount of time was, therefore, spent on the fitting of the triangular keys into their V-grooves. As a result, alignment of the rotor became more difficult due to the bad contact between the keys and grooves further resulting in an inability to obtain repeatable alignment moves.

SUMMARY OF THE INVENTION

Accordingly, it is a general object of the present invention to provide a method and apparatus for aligning a turbine or generator rotor. More specifically, it is an object of the present invention to provide a method and apparatus for aligning a rotor which incorporates a novel journal bearing support.

Another object of the present invention is to provide a method and apparatus for aligning a rotor which minimizes the periods of down-time required for such alignment.

Still another object of the present invention is to provide a method and apparatus for aligning a rotor which substantially eliminates the necessity of repeated handworking of the bearing support pads or keys in order to maintain a desired percentage of contact between the bearing support pads or keys and their mating groove in the bearing support.

A further object of the present invention is to provide a sufficiently stiff rotor support arrangement that provides adequate mobility for rotor alignment and takes a minimum amount of time to install, align and realign in the field.

Still a further object of the present invention is to provide a journal bearing support which is capable of being applied to both partial-arc as well as tilting-pad type journal bearings without any loss of the advantages stated above.

Briefly, these and other objects of the present invention are accomplished by a journal bearing support and alignment device that utilizes a two-key arrangement which provide perpendicular cylindrical surfaces for the necessary motion to establish parallel alignment with a mating flat machined surface in the bearing housing without disturbing the contact surface areas. The necessary alignment move is accomplished using a flat rectangular shim between the bearing support and key arrangement without resulting in a loss of contact surface area. This bearing support arrangement results in the elimination of field machining perpendicular surfaces, the field fitting of surfaces, and the use of custom complex tapered shims. It, therefore, simplifies the field assembly and alignment of the bearings and results in a significant time savings in the field.

In accordance with one important aspect of the invention, the journal bearings and alignment device is comprised generally of three pieces. The upper piece is a rectangular key with a cylindrical surface machined lengthwise on the top and a cylindrical surface perpendicular to the top machined on the bottom. In order to maintain contact with the bearing shell, the top cylindrical surface is machined to match a mating cylindrical surface machined axially into the outside diameter of the bearing shell. The middle piece is a rectangular key of slightly larger length and width as compared to the upper piece with a flat bottom surface and a cylindrical upper surface machined to match the bottom surface of the upper piece. Finally, the bottom piece is a flat variable thickness rectangular shim of approximately the same width and length of the middle piece.

The three pieces fit together and support the bearing shell at its bottom 45° points to the bearing support as is conventional. The bearing support has a flat surface machined at the bottom 45° points to accept this key arrangement. All the mating surfaces with the exceptional of the bottom piece to the bearing support are machined and fit in the shop, such that prior to assembly in the field, sufficient contact between the surfaces is already established. Because of such prior shopfitting, and due to the simplicity of the cylindrical surfaces versus that of the prior art spherical or triangular key-tapered shim combinations, the fitted surfaces are able to retain their fit during field assembly and bearing alignment. Subsequently, the only field requirement is that the flat surfaces machined in the bearing support be flat. Any difficulty in field machining the surface parallel to the imaginary rotor centerline will be corrected by the key arrangement capability to self-align to the machined surface. Horizontal and/or vertical alignment moves can be conveniently made by a calculated one-step shim change at the bottom piece location.

In accordance with yet another important aspect of the invention, the journal bearing support and alignment device is held into the bearing support by a retaining plate that bolts into the bearing support. This plate prevents the middle and bottom pieces from moving with respect to the bearing support. Unnecessary movement of the upper piece is restrained due to the compression load which the upper piece transmits, combined with its geometry which prevents it from sliding out. This upper piece is, therefore, self-positioning with respect to the middle piece and bearing shell, thus eliminating any gaps between the contact surfaces. In order to provide access to measure shim thickness during alignment, the retaining plate is relieved at its lower two corners exposing the corners of the bottom piece. As a result, the complete device can be removed by unbolting the retaining plate and sliding the three pieces out axially as if they were one piece. The bearing can then be removed with the rotor supported on its rotor jacks by unbolting the bearing halves and rolling out the bottom half of the bearing.

The above and other objects, advantages, and novel features of the present invention will become more apparent from the following detailed description of a preferred embodiment when considered in conjunction with the accompanying drawings wherein:

BRIEF DESCRIPTION OF THE DRAWINGS

FIG. 1A is an end view of a rotor supported by a journal bearing, showing a prior art triangular key, as well as the journal bearing support and alignment device according to the present invention;

FIG. 1B is an enlarged view of the grooves formed for supporting a journal bearing according to the present invention;

FIG. 2 illustrates in sectional view the apparatus of FIG. 1A taken along the line II—II;

DETAILED DESCRIPTION OF THE PREFERRED EMBODIMENT

Figure 3:
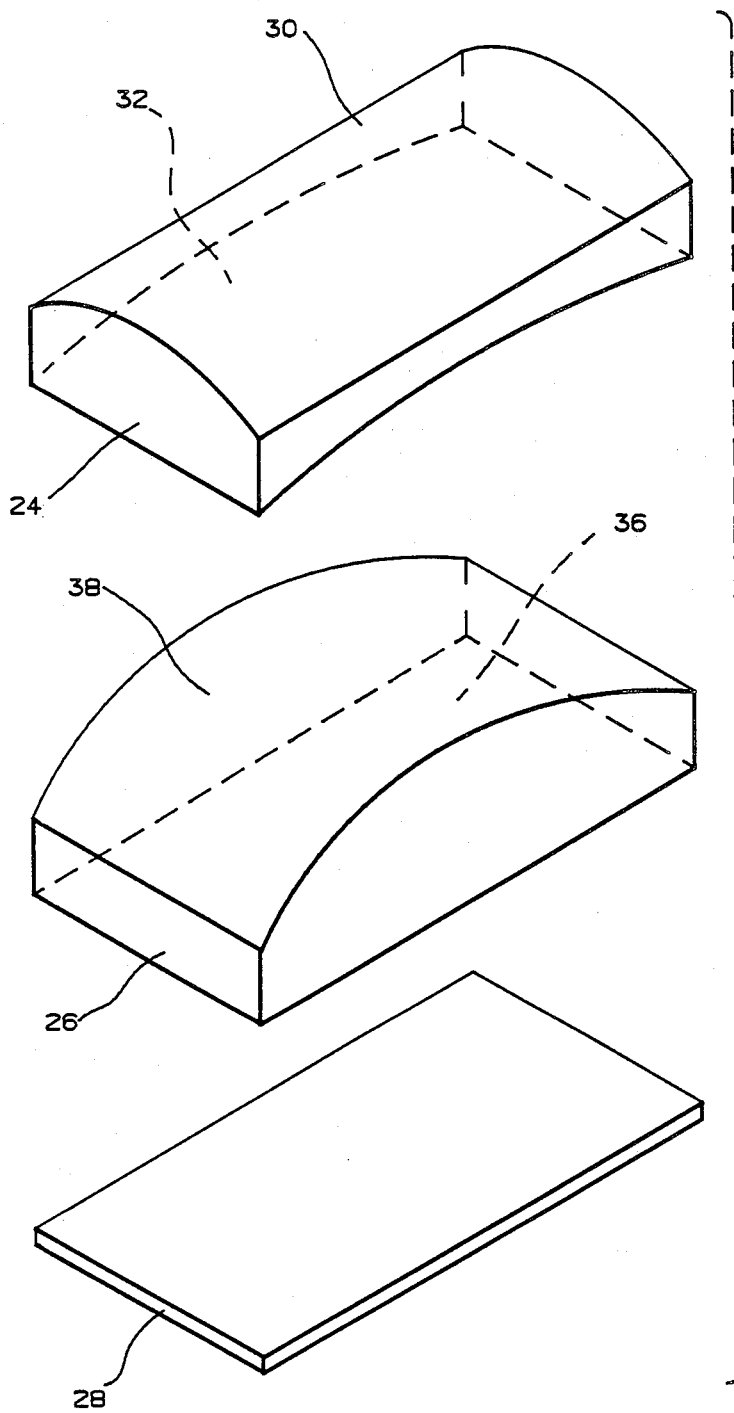
FIG. 3 is an exploded view of the journal bearing support and alignment device shown in FIGS. 1A and 2.

Referring now to the drawings, wherein like characters designate like or corresponding parts throughout the several views, there is shown in FIG. 1A a rotor 2 supported at its end by a journal bearing 4 which include an upper half 6 and a lower half 8. The upper half 6 and lower half 8 of the journal bearing 4, as is conventional, are adapted to be joined together by any suitable attachment means 10, thereby forming a bearing shell 12 which is mounted upon a bearing pedestal or support 14.

As conventionally employed in a steam turbine or generator, the lower half 8 of the journal bearing 4 may be supported by a triangular key 16 fitted within a mating V-groove 18 in the bearing support 14, with complex tapered shims 20 placed between the triangular key 16 and the bearing shell 12 in order to align the rotor 2. As described herein above, however, the prior art bearing support systems which employ a triangular key 16, V-groove 18, and tapered shims 20, suffered from difficulty of fabrication as well as field adjustment.

In order to overcome such difficulties, a novel three-piece journal bearing support and alignment device is shown generally at 22. As in prior art approaches, the device 22 is adapted to be installed at the bottom 45° point (indicated by the dashed lines) of the bearing shell 12. The device 22, as shown in conjunction with FIGS. 2 and 3, is comprised generally of an upper seating pad 24, a bottom seating pad 26, and a shim 28. Accordingly to one important aspect of the invention, the upper seating pad 24 is a rectangular key with cylindrical surface 30 machined lengthwise on its top, and a lower cylindrical surface 32 perpendicular to the top cylindrical surface 30 machined on the bottom of the upper seating pad 24. In order to mate with the bearing shell 12, a matching cylindrical surface 34 is machined axially into the outside diameter of the bearing shell 12. The bottom seating pad 26, on the other hand, is a rectangular key of slightly larger length and width as compared to the upper seating pad 24 with a flat bottom surface 36 and a cylindrical upper surface 38 machined to match the lower cylindrical surface 32 of the upper seating pad 24. The bottom piece 28 as described hereinabove is a flat variable thickness rectangular shim of approximately the same width and length as the bottom seating pad 26. In order to install the device 22 for support of a journal bearing 4, the bearing support 14 has formed therein at its bottom 45° point a pair of grooves 40 having a flat surface 42 (FIG. 1B) machined perpendicularly to the bottom 45° point. All of the mating surfaces 30, 32, 34, 36, and 38 are machined and fit in the shop such that prior to assembly of the journal bearing support and alignment device 22 in the field sufficient contact between the cylindrical surfaces has already been established.

The device 22 is held into the bearing support 14 by a retaining plate 44 connected to the bearing support 14 by any suitable means such as a pair of bolts 46. This plate 44 prevents the free-floating bottom seating pad 26 and shim 28 from moving with respect to the bearing support 14. Because of its smaller dimensions in length and width as compared to the bottom seating pad 26, and because of its mating cylindrical surfaces 30 and 32, the upper seating pad 24 is merely placed within the axial cylindrical groove 34 of the bearing shell 12 and permitted to self-align without connection to either the bearing shell 12, bearing support 14 or the bottom seating pad 26. As explained hereinabove, uniform contact of surfaces 30, 32, 34 and 42 is maintained by the compression loads which it transmits from the rotor 2 to the bearing support 14. The retaining plate 44 further includes two relief portions 48, one at each bottom corner, in order that the thickness of the shim 28 may be measured during alignment of the rotor.

Once installed within a journal bearing 4, the device 22 can be conveniently removed by unbolting the retaining plate 44 and sliding the upper seating pad 24, bottom seating pad 26 and shim 28 out axially as a unit. The journal bearing 4 can subsequently be removed with the rotor 2 supported on its rotor jacks (not shown) by unbolting the bearing halves 6 and 8 and rolling out the lower half 8. Horizontal and/or vertical alignment moves can subsequently be made by a calculated one-step change of the shim 28. It should also be noted that alignment moves can be made without removing the bearing 4. Only the upper seating pad 24, bottom seating pad 26, and shim 28 need be removed, and the shim 28 be replaced.

Although a particular embodiment of the invention has been shown and described, and various modifications suggested, it will be appreciated that other embodiments and modifications which fall within the true spirit and scope of the invention as set forth in the appended claims will occur to those of ordinary skill in the art.

What is claimed:

1. Apparatus for aligning a rotor centrally within a reference bore, each end of the rotor being supported by a respective journal bearing including an upper half and a lower half joined together by a bearing shell for mounting within a bearing pedestal, comprising at each rotor end:
    a pair of grooves formed axially within the lower half of the bearing shell, each said groove having a cylindrical surface;
    an upper seating pad inserted within each said groove, said upper seating pad including a top cylindrical surface adapted to conform to said cylindrical surface of each said groove, and a lower cylindrical surface formed perpendicularly to said top cylindrical surface;
    a bottom seating pad mated to each said upper seating pad, said bottom seating pad having a cylindrical upper surface adapted to conform to said lower cylindrical surface of said mated upper seating pad, and a flat bottom surface; and
    means for retaining each said bottom seating pad relative to the bearing pedestal.

2. The apparatus according to claim 1, further comprising a pair of keyways formed in the bearing pedestal axially with respect to the rotor, each said keyway including a flat surface adapted to conform with said flat bottom surface of said bottom seating pad.

3. The apparatus according to claim 2, further comprising at least one shim inserted within said keyways between said flat bottom surface of said bottom seating pad and said flat surface of said keyway.

4. The apparatus according to claim 3, wherein said at least one shim is tapered.

5. The apparatus according to claim 2, wherein said retaining means comprises a pair of plates, each said plate attached to a respective side of the bearing pedestal substantially closing said keyways thereby retaining said bottom seating pad contained therein.

6. The apparatus according to claim 5, wherein said plates each include a relief portion formed to permit inspection of said bottom seating pad and shim.

7. The apparatus accordingly to claim 1, wherein said grooves are spaced substantially 90° apart, each said groove being formed in said bearing pedestal 45° from the horizontal.

8. In a journal bearing comprising an upper half and a lower half joined together, to form a bearing shell mounted within a bearing pedestal, a support key comprising:
- an upper seating pad having a top surface adapted to conform to the bearing shell and a lower cylindrical surface; and
- a bottom seating pad mated to said upper seating pad, said bottom seating pad having a cylindrical upper surface adapted to conform to said lower cylindrical surface of said upper seating pad.

9. The support key according to claim 8, wherein said top surface of said upper seating pad comprises a cylindrical surface formed perpendicular to said lower cylindrical surface.

10. The support key according to claim 9, wherein said cylindrical surface corresponding to the top surface of said upper seating pad comprises a male surface and said lower cylindrical surface comprises a female surface.

11. The support key according to claim 8, wherein said cylindrical upper surface of said bottom seating pad is longer and wider than said lower cylindrical surface of said upper seating pad.

12. The support key according to claim 8, further comprising a flat rectangular shim of predetermined thickness.

13. The support key according to claim 12, further comprising a pair of retaining plates, each said plate being attached to a respective side of the bearing pedestal to fix said bottom seating pad and said shim relative thereto.

14. The support key according to claim 13, wherein each said plate includes access means for determining the thickness of said shim.

* * * * *